(12) United States Patent
Mizuguchi et al.

(10) Patent No.: US 7,180,683 B2
(45) Date of Patent: Feb. 20, 2007

(54) ZOOM LENS SYSTEM

(75) Inventors: Keiko Mizuguchi, Kawasaki (JP); Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/081,511

(22) Filed: Mar. 17, 2005

(65) Prior Publication Data

US 2005/0157405 A1 Jul. 21, 2005

Related U.S. Application Data

(63) Continuation of application No. 10/651,201, filed on Aug. 29, 2003, now abandoned.

(30) Foreign Application Priority Data

Aug. 30, 2002 (JP) ............................. 2002-255077

(51) Int. Cl.
*G02B 15/14* (2006.01)
(52) U.S. Cl. ..................................... 359/689
(58) Field of Classification Search ............... 359/683, 359/689
See application file for complete search history.

(56) References Cited

U.S. PATENT DOCUMENTS

| | | | |
|---|---|---|---|
| 5,909,318 A | 6/1999 | Tanaka | 359/689 |
| 6,124,984 A | 9/2000 | Shibayama et al. | 359/689 |
| 6,229,655 B1 | 5/2001 | Kohno et al. | 359/689 |
| 6,349,002 B1 | 2/2002 | Shibayama et al. | 359/689 |
| 6,351,337 B1 | 2/2002 | Tanaka | 359/684 |
| 6,456,443 B2 | 9/2002 | Kohno et al. | 359/689 |
| 6,532,114 B1 | 3/2003 | Kohno et al. | 359/689 |
| 6,545,819 B1 | 4/2003 | Nanba et al. | 359/689 |
| 6,618,210 B2 | 9/2003 | Noguchi et al. | 359/689 |
| 6,654,180 B2 | 11/2003 | Ori | 359/689 |
| 6,671,103 B2 | 12/2003 | Itoh | 359/680 |
| 6,785,057 B2 | 8/2004 | Ori | 359/689 |
| 6,822,808 B2 | 11/2004 | Nanba et al. | 359/689 |
| 6,833,964 B2 * | 12/2004 | Mizuguchi et al. | 359/689 |
| 6,917,476 B2 | 7/2005 | Eguchi | 359/689 |
| 2003/0072085 A1 | 4/2003 | Mizuguchi et al. | 359/680 |
| 2003/0123156 A1 | 7/2003 | Minefuji | 359/682 |

(Continued)

FOREIGN PATENT DOCUMENTS

JP 10-170826 6/1998

(Continued)

*Primary Examiner*—Scott J. Sugarman
(74) *Attorney, Agent, or Firm*—Miles & Stockbridge P.C.

(57) ABSTRACT

The invention provides a zoom lens system suitable for an image gathering system using a solid-state imaging device, having a zoom ratio of about three, a small lens length, and superb optical performance. The zoom lens system includes, in order from an object, a first lens group having negative refractive power, a second lens group having positive refractive power, and a third lens group having positive refractive power. The first lens group consists only of a negative lens and a positive lens. The second lens group includes at least two positive lenses and at least one negative lens. The third lens group consists of one lens. Zooming from a wide-angle end state to a telephoto end state is conducted by decreasing a distance between the first and second lens groups, increasing a distance between the second and third lens groups, and fixing the third lens group. Given conditions are satisfied.

18 Claims, 10 Drawing Sheets

U.S. PATENT DOCUMENTS

2003/0210471 A1  11/2003  Mihara et al.

FOREIGN PATENT DOCUMENTS

| JP | 10-293295 | 11/1998 |
| JP | 2000-267009 | 9/2000 |
| JP | 2001-13408 | 1/2001 |
| JP | 2002-014284 | 1/2002 |
| JP | 2002-196238 | 7/2002 |
| JP | 2003-57545 | 2/2003 |
| JP | 2003-107351 | 4/2003 |

* cited by examiner

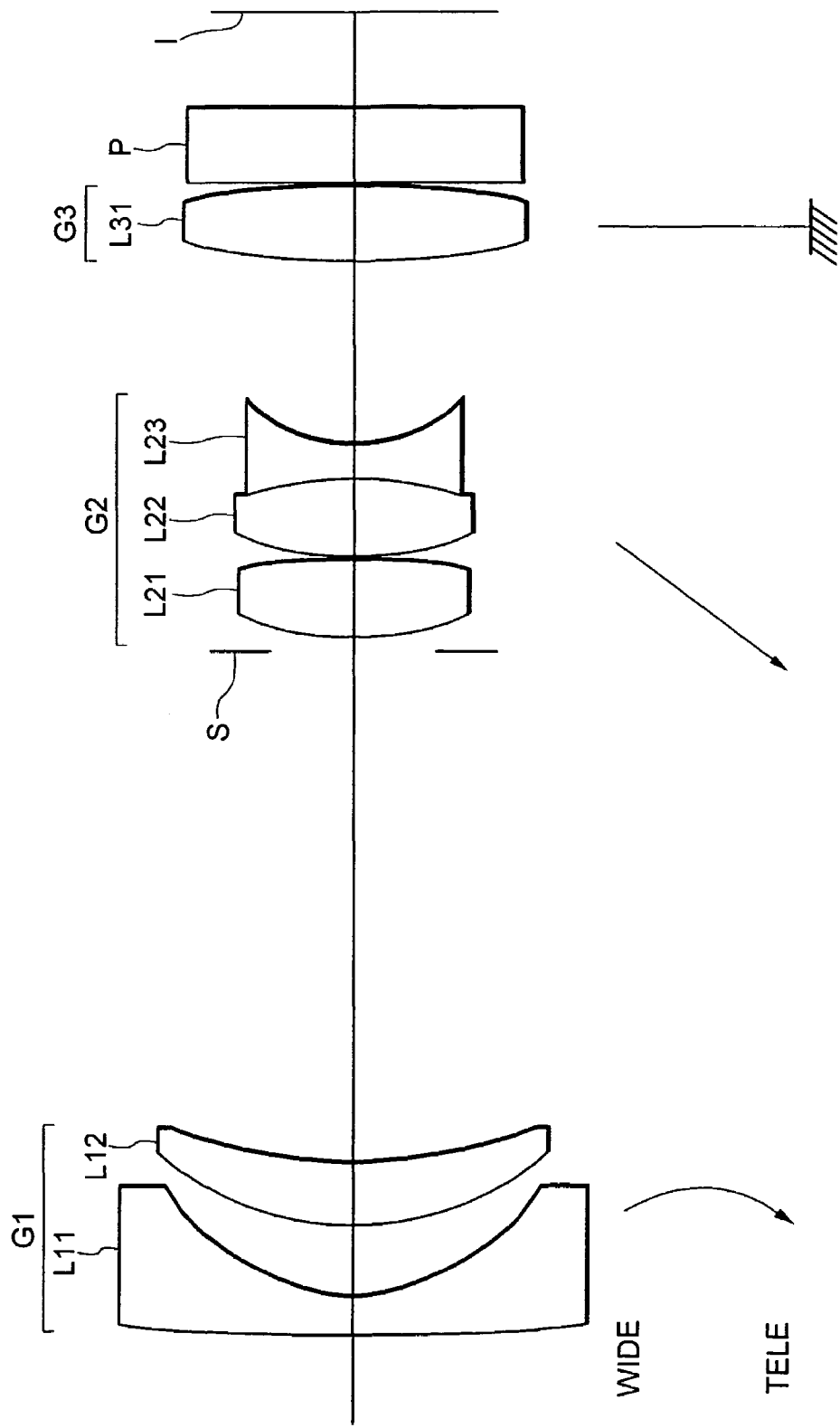

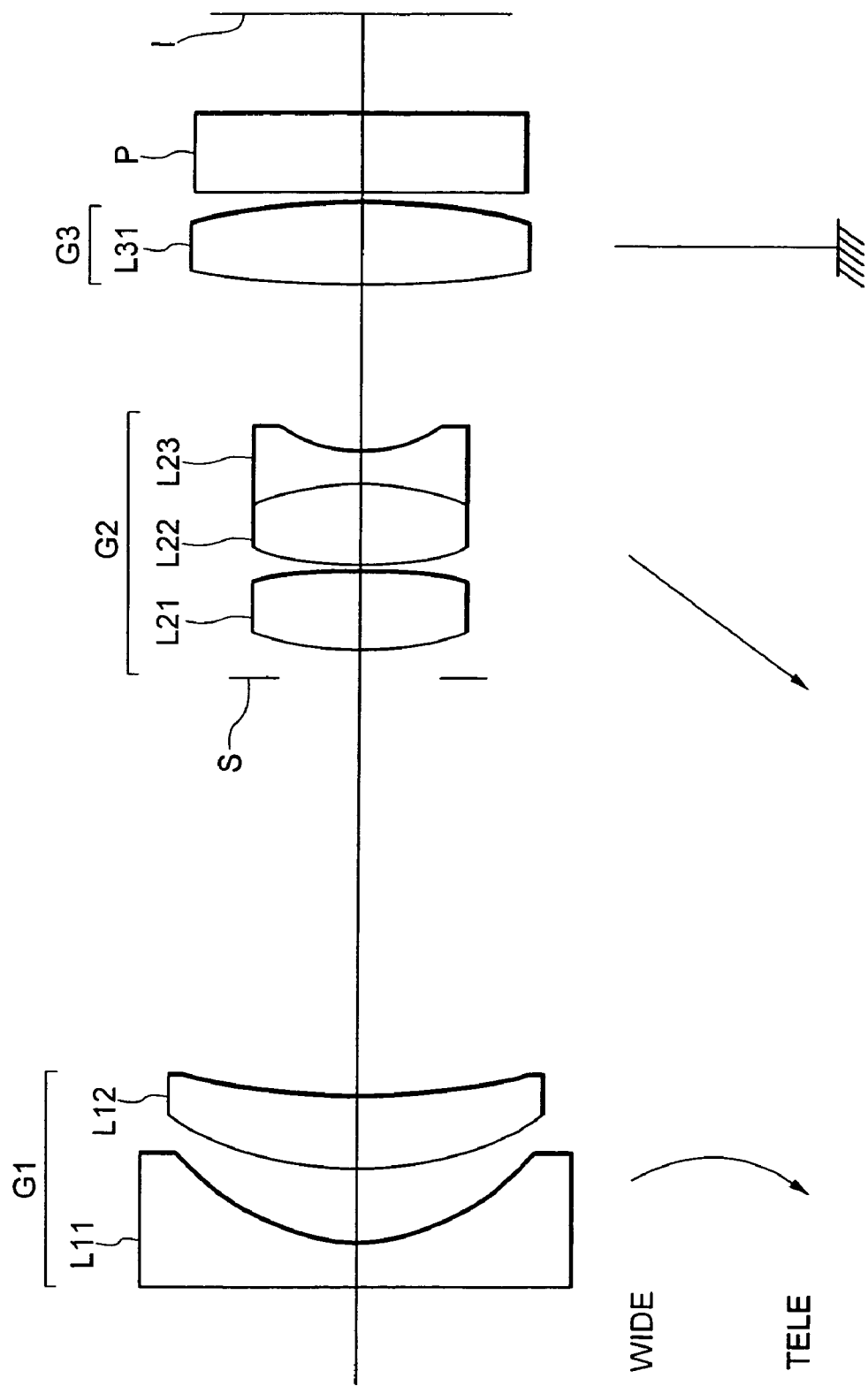

ZOOM LENS SYSTEM

CROSS-REFERENCE TO RELATED APPLICATION

This application is a continuation of application Ser. No. 10/651,201 filed Aug. 29, 2003 now abandoned.

This application claims the benefit of Japanese Patent application No. 2002-255077 which is hereby incorporated by reference.

BACKGROUND OF THE INVENTION

1. Field of the Invention

The present invention relates to a compact zoom lens system and, in particular, to a zoom lens system designed specially to be compact with its whole optical system, being suitable for such as a digital still camera.

2. Related Background Art

In an image gathering system using a solid-state imaging device, in order to arrange a low-pass filter or a color correction filter, a lens system having a relatively long back focal length is required. Moreover, a lens system having a good telecentricity on an image side is required. In these days, compactness and low cost are also required to a lens system in addition to satisfying these requirements.

These lens systems described above have been proposed, for example, in Japanese Patent Application Laid-Open No. 10-293253 and in Japanese Patent Application Laid-Open No. 2001-013408.

In Japanese Patent Application Laid-Open No. 10-293253, a three-lens-group zoom lens system having, in order from an object side, a first lens group having negative refractive poser, a second lens group having positive refractive power, and a third lens group having positive refractive power wherein zooming from a wide-angle end state to a telephoto end state is carried out by moving the first lens group and the second lens group, has been proposed.

Japanese Patent Application Laid-Open No. 2001-013408 proposes a variable focal length lens system having construction that reduces the number of lens elements in a first lens group.

However, the zoom lens system proposed in Japanese Patent Application Laid-Open No. 10-293253 has drawbacks such as relatively large number of lens elements composing each lens group, relatively large total lens length, and higher manufacturing costs.

Moreover, Japanese Patent Application Laid-Open No. 2001-013408 discloses an optical system in which a positive lens element is arranged on the most object side of a first lens group having negative refractive power. Accordingly, it has a drawback that the diameter of the lens system inevitably becomes large when the system is made to have a wider angle of view. Furthermore, since the first lens group separates largely from the aperture stop in the wide-angle end state, the height of an off-axis ray incident to the first lens group becomes large, so that the diameter of the lens composing the first lens group becomes large. As a result, the lens system has a drawback that the whole lens system becomes large.

SUMMARY OF THE INVENTION

The present invention is made in view of the aforementioned problems and has an object to provide a zoom lens system suitable for a image gathering system using a solid-state imaging device, having a zoom ratio of about three, a small total lens length, and superb optical performance.

According to one aspect of the present invention, a zoom lens system includes, in order from an object, a first lens group having negative refractive power, a second lens group having positive refractive power, and a third lens group having positive refractive power. The first lens group consists only of a negative lens element and a positive lens element. The second lens group includes at least two positive lens elements and at least one negative lens element. The third lens group consists of one lens element. When the state of lens group positions varies from a wide-angle end state to a telephoto end state, a distance between the first lens group and the second lens group decreases, a distance between the second lens group and the third lens group increases, and the third lens group is fixed. The following conditional expression (1) is satisfied:

$$2.5 < TL/(ft \times fw)^{1/2} < 4.5 \qquad (1)$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

Since the first lens group is composed only of a negative lens element and a positive lens element, and the third lens group is composed of a single lens element, it becomes easy to assemble and adjust the first and third lens groups, so it helps to lower the manufacturing cost.

Moreover, when the state of lens group positions varies from the wide-angle end state to the telephoto end state, the third lens group is fixed. Accordingly, the zooming mechanism can be simplified.

In one preferred embodiment of the present invention, the first lens group preferably has at least one aspherical surface. The second lens group preferably has at least one aspherical surface.

In one preferred embodiment of the present invention, it is preferable that the second lens group consists of, in order from the object, a positive lens element, a double convex positive lens element and a negative lens element, the double convex positive lens element being cemented with the negative lens element, and the third lens group consists of one positive lens element.

In one preferred embodiment of the present invention, the most object side lens surface of the second lens group has a convex shape facing to the object side, the most image side lens surface of the second lens group has a concave shape facing to the image side, and the following conditional expression (2) is preferably satisfied:

$$-4.0 < (G2r1 + G2r2)/(G2r2 - G2r1) < -1.0 \qquad (2)$$

where $G2r1$ denotes the radius of curvature of the most object side lens surface of the second lens group, and $G2r2$ denotes the radius of curvature of the most image side lens surface of the second lens group.

In one preferred embodiment of the present invention, the following conditional expression (3) is satisfied:

$$-0.5 < (G3r1 + G3r2)/(G3r2 - G3r1) < 0.5 \qquad (3)$$

where $G3r1$ denotes the radius of curvature of the most object side lens surface of the third lens group, and $G3r2$ denotes the radius of curvature of the most image side lens surface of the third lens group.

In one preferred embodiment of the present invention, the one lens element composing the third lens group has positive refractive power and has at least one aspherical surface.

In one preferred embodiment of the present invention, focusing from infinity to close object is conducted by moving the third lens group in the object direction.

Other feature and advantages according to the present invention will be readily understood from the detailed description of the preferred embodiments in conjunction with the accompanying drawings.

BRIEF DESCRIPTION OF THE DRAWINGS

FIG. 1 is a sectional view showing a zoom lens system according to Example 1 of the present invention together with the movement of each lens group upon zooming.

FIG. 3 is a sectional view showing a zoom lens system according to Example 2 of the present invention together with the movement of each lens group upon zooming.

DETAILED DESCRIPTION OF THE PREFERRED EMBODIMENTS

Figure 2A:
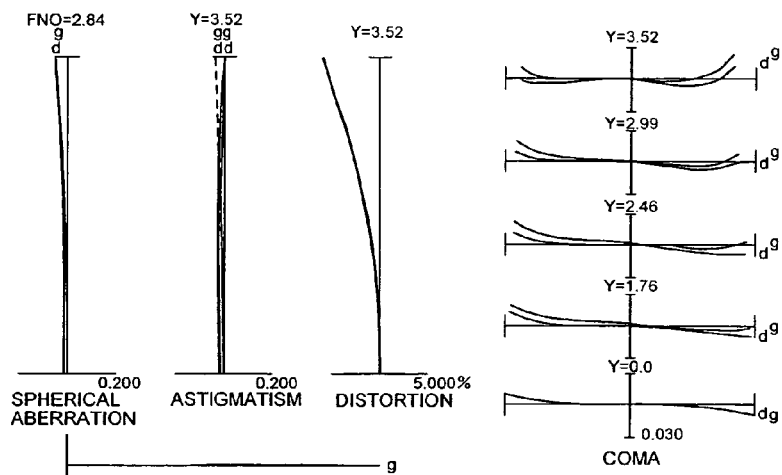
FIGS. 2A through 2C are graphs showing various aberrations of the zoom lens system according to Example 1 in a wide-angle end state, an intermediate focal length state, and a telephoto end state, respectively.

The preferred embodiments according to the present invention are going to be explained below.

A zoom lens system according to the present invention includes, in order from an object, a first lens group having negative refractive power, a second lens group having positive refractive power, and a third lens group having positive refractive power. The first lens group consists only of one negative lens element and one positive lens element. The second lens group includes at least two positive lens elements and at least one negative lens element. The third lens element consists of one lens element. When the state of lens group positions varies from a wide-angle end state to a telephoto end state, a distance between the first lens group and the second lens group decreases, a distance between the second lens group and the third lens group increases, and the third lens group is fixed. The following conditional expressions (1) is satisfied:

$$2.5 < TL/(ft \times fw)^{1/2} < 4.5 \quad (1)$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

Furthermore, at least one of the following conditional expressions (2) and (3) are preferably satisfied:

$$-4.0 < (G2r1+G2r2)/(G2r2-G2r1) < -1.0 \quad (2)$$

$$-0.5 < (G3r1+G3r2)/(G3r2-G3r1) < 0.5 \quad (3)$$

where G2r1 denotes the radius of curvature of the most object side surface of the second lens group, G2r2 denotes the radius of curvature of the most image side surface of the second lens group, G3r1 denotes the radius of curvature of the most object side surface of the third lens group, and G3r2 denotes the radius of curvature of the most image side surface of the third lens group.

Conditional expression (1) defines the dimension of the total lens length with respect to the focal length of the zoom lens system. When the ratio $TL/(ft \times fw)^{1/2}$ exceeds the upper limit of conditional expression (1), the total lens length of the zoom lens system becomes too long, so that the zoom lens system cannot be compact. On the other hand, when the ratio falls below the lower limit of conditional expression (1), the number of lens elements composing the zoom lens system according to the present invention cannot be arranged.

Moreover, it is more preferable that either one or both of the upper and lower limits of conditional expression (1) are satisfied 4.2 and 3.0, respectively.

Conditional expression (2) defines the lens shape of the second lens group. When the ratio (G2r1+G2r2)/(G2r2−G2r1) falls below the lower limit of conditional expression (2), spherical aberration produced by the positive lens element arranged to the most object side become excessive in the negative direction, so that correction of spherical aberration by the whole lens elements of the zoom lens system becomes difficult. On the other hand, when the ratio exceeds the upper limit of conditional expression (2), spherical aberration produced by the negative lens element arranged to the most image side become excessive in the positive direction, so that correction of spherical aberration by the whole lens elements of the zoom lens system becomes difficult.

Conditional expression (3) defines the lens shape of the third lens group. When the ratio (G3r1+G3r2)/(G3r2−G3r1) exceeds the upper limit of conditional expression (3), it becomes difficult to correct astigmatism and distortion satisfactorily. On the other hand, when the ratio falls below the lower limit of conditional expression (3), it becomes difficult to correct astigmatism and coma satisfactorily, so that it is undesirable.

Numerical examples according to the present invention are going to be explained below with reference to accompanying drawings.

EXAMPLE 1

FIG. 1 is a sectional view showing a zoom lens system according to Example 1 of the present invention together with the movement of each lens group upon zooming. The arrows indicate the movement of each lens group from the wide-angle end state (WIDE) to the telephoto end state (TELE). In the other Examples the same representation is applied.

A zoom lens system according to Example 1 is composed of, in order from the object, a first lens group G1 having negative refractive power, a second lens group G2 having positive refractive power with an aperture stop S, and a third lens group G3 having positive refractive power.

The third lens group G3 is fixed and the first lens group G1 and the second lens group G2 are moved. In this lens construction, when the state of lens group positions varied from the wide-angle end state (WIDE) to the telephoto end state (TELE), a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing to the image, and a positive meniscus lens L12 having a convex surface facing to the object.

The second lens group G2 is composed of, in order from the object, a double convex positive lens L21, and a cemented negative lens constructed by a double convex positive lens L22 cemented with a double concave negative lens L23.

The third lens group G3 is composed of a double convex positive lens L31 only. Focusing from infinity to close object is conducted by moving the third lens group G3 in the object direction.

In each example of the present invention, in order to eliminate spatial frequency higher than resolution limit of an imaging device arrange in the focal plane, a filter, in particular a low-pass filter P, is placed between the third lens group G3 and the image plane I.

Various values associated with Example 1 are listed in Table 1. In the [Specifications], f denotes the focal length, FNO denotes the f-number, and 2ω denotes the maximum value of an angle of view (unit: degree). In [Lens Data], the first column is a surface number counted in order from the object side, the second column "r" is a radius of curvature of a lens surface, the third column "d" is a distance between adjacent lens surfaces, the fourth column "ν" is Abbe number, and the fifth column "n" is refractive index for d-line (λ=587.6 nm). In [Variable Distance Data], the focal length and variable distance values in the wide-angle end state, in the intermediate focal length state, and in telephoto end state are listed. In [Values for Conditional Expressions], value of the parameter in each conditional expression is shown. Values in the following each Example are denoted by the same reference symbols as Example 1. The reference symbol "E-n" in the aspherical data denotes "×10$^{-n}$" (where n is an integer.)

In each examples, an aspherical surface is expressed by the following expression:

$$X(y)=y^2/[r \cdot [1+(1-k \cdot y^2/r^2)^{1/2}]]+C4 \cdot y^4+C6 \cdot y^6+C8 \cdot y^8+C10 \cdot y^{10}$$

where X(y) denotes the distance along the optical axis from the tangent plane on the vertex of the aspherical surface to the position of the aspherical surface at the height of y, r denotes a paraxial radius of curvature, κ denotes the conical coefficient, and Ci denotes i-th order aspherical surface coefficient.

In the tables for various values, "mm" is generally used for the unit of length such as the focal length, a radius of curvature, a distance between the adjacent surfaces. However, since an optical system proportionally enlarged or reduced its dimension can be obtained similar optical performance, the unit is not necessary to be limited to "mm" and any other suitable unit can be used.

TABLE 1

[Specifications]

| | Wide-angle end | Telephoto end |
|---|---|---|
| f = | 5.80 | 16.24 |
| FNO = | 2.84 | 5.05 |
| 2ω = | 65.4° | 24.2° |

[Lens Data]

| | r | d | ν | n |
|---|---|---|---|---|
| 1) | 69.540 | 1.1 | 49.3 | 1.743 |
| 2) | 5.410 | 2.1 | | 1.000 |
| 3) | 8.752 | 1.8 | 23.8 | 1.847 |
| 4) | 16.022 | (d4) | | 1.000 |
| 5> | ∞ | 0.4 | | 1.000 |
| 6) | 8.511 | 2.3 | 61.3 | 1.589 |
| 7) | −19.690 | 0.1 | | 1.000 |
| 8) | 9.038 | 2.3 | 46.6 | 1.804 |
| 9) | −9.781 | 1.0 | 30.1 | 1.699 |
| 10) | 4.230 | (d10) | | 1.000 |
| 11) | 19.400 | 2.3 | 40.5 | 1.731 |
| 12) | −26.049 | 0.1 | | 1.000 |
| 13) | ∞ | 2.2 | 64.2 | 1.517 |
| 14) | ∞ | | | |

[Aspherical Surface Data]

Surface Number = 2

| κ = | 0.5630 |
|---|---|
| C2 = | 0.00 |
| C4 = | −7.35E−5 |
| C6 = | 1.46E−6 |
| C8 = | −1.12E−7 |
| C10 = | 0.00 |

Surface Number = 6

| κ = | 1.7803 |
|---|---|
| C2 = | 0.00 |
| C4 = | −5.91E−4 |
| C6 = | −9.20E−6 |
| C8 = | 1.89E−7 |
| C10 = | 0.00 |

Surface Number = 11

| κ = | 12.7720 |
|---|---|
| C2 = | 0.00 |
| C4 = | −3.77E−4 |
| C6 = | 7.09E−6 |
| C8 = | −4.20E−7 |
| C10 = | 0.00 |

[Variable Distance Data]

| | Wide-angle end | Intermediate | Telephoto end |
|---|---|---|---|
| f | 5.80 | 9.28 | 16.24 |
| d4 | 15.06 | 8.00 | 2.96 |
| d10 | 5.44 | 9.39 | 17.28 |
| TL | 38.83 | 35.72 | 38.58 |

[Values for Conditional Expressions]

(1) TL/(ft×fw)$^{1/2}$ = 4.0 (Wide-angle end state)
= 3.7 (Intermediate focal length state)
= 4.0 (Telephoto end state)
(2) (G2r1 + G2r2)/(G2r2 − G2r1) = −2.98
(3) (G3r1 + G3r2)/(G3r2 − G3r1) = 0.15

Figure 2B:
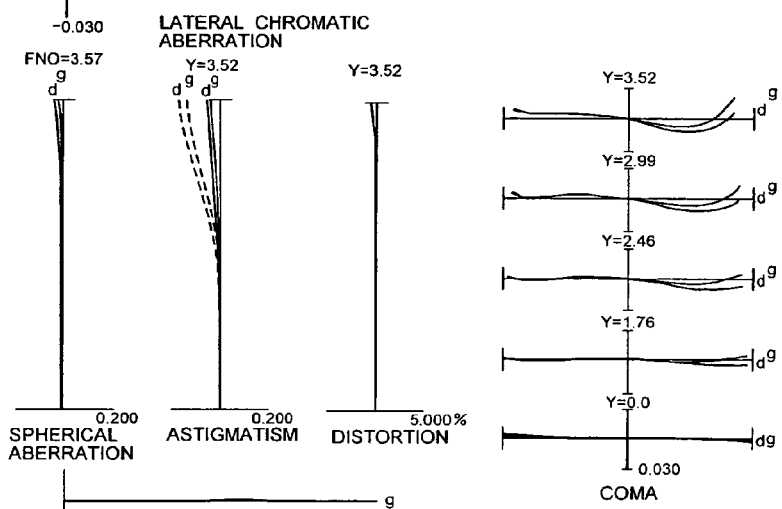
Figure 2C:
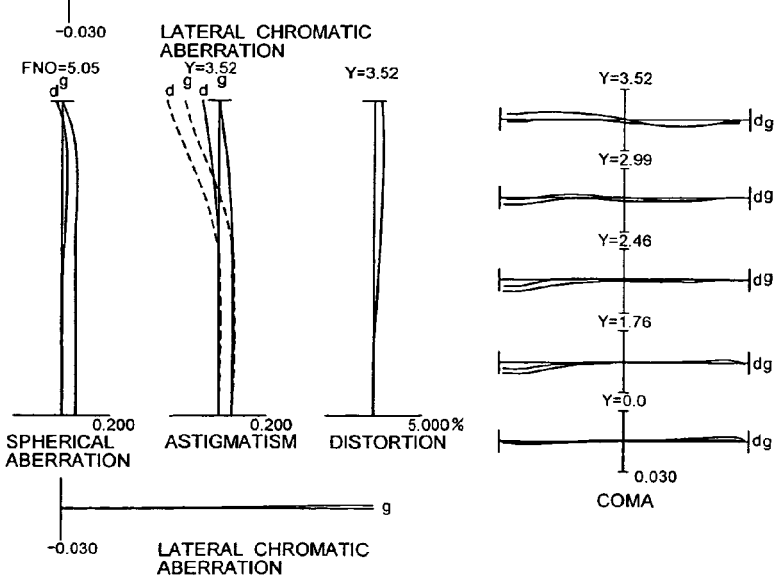

FIGS. 2A through 2C are graphs showing various aberrations of the zoom lens system according to Example 1 in a wide-angle end state, an intermediate focal length state, and a telephoto end state, respectively.

In graphs for various aberrations, FNO denotes the f-number, Y denotes an image height. In the diagrams showing spherical aberration, FNO denotes f-number with respect to the maximum aperture. In the diagrams showing astigmatism and distortion, Y denotes the maximum image height. In the diagrams showing coma, Y denotes an image height for each image. Reference symbol d denotes d-line ($\lambda$=587.6 nm), and g denotes g-line ($\lambda$=435.6 nm). In the diagrams showing astigmatism, a solid line indicates a sagittal image plane and a broken line indicates a meridional image plane.

In graphs for various aberrations in the following Examples, the same reference symbols as those of this Example are used.

As is apparent from the respective graphs, the zoom lens system according to Example 1 shows superb optical performance as a result of good corrections to various aberrations.

EXAMPLE 2

FIG. 3 is a sectional view showing a zoom lens system according to Example 2 of the present invention together with the movement of each lens group upon zooming.

A zoom lens system according to Example 2 is composed of, in order from the object, a first lens group G1 having negative refractive power, a second lens group G2 having positive refractive power with an aperture stop S, and a third lens group G3 having positive refractive power.

The third lens group G3 is fixed and the first lens group G1 and the second lens group G2 are moved. In this lens construction, when the state of lens group positions varied from the wide-angle end state (WIDE) to the telephoto end state (TELE), a distance between the first lens group G1 and the second lens group G2 decreases, and a distance between the second lens group G2 and the third lens group G3 increases.

The first lens group G1 is composed of, in order from the object, a double concave negative lens L11, and a positive meniscus lens L12 having a convex surface facing to the object.

The second lens group G2 is composed of, in order from the object, a double convex positive lens L21, and a cemented negative lens constructed by a double convex positive lens L22 cemented with a double concave negative lens L23.

The third lens group G3 is composed of a double convex positive lens L31 only. Focusing from infinity to close object is conducted by moving the third lens group G3 in the object direction.

Various values associated with Example 2 are listed in Table 2.

TABLE 2

[Specifications]

|  | Wide-angle end | Telephoto end |
| --- | --- | --- |
| F = | 5.79 | 16.28 |
| FNO = | 2.84 | 5.11 |
| 2$\omega$ = | 65.4° | 24.2° |

[Lens Data]

| | r | d | $\nu$ | n |
| --- | --- | --- | --- | --- |
| 1) | −419.026 | 1.2 | 49.2 | 1.743 |
| 2) | 5.444 | 2.0 | | 1.000 |
| 3) | 9.492 | 2.0 | 23.8 | 1.847 |
| 4) | 21.493 | (d4) | | 1.000 |
| 5> | ∞ | 0.8 | | 1.000 |
| 6) | 8.767 | 2.3 | 61.2 | 1.589 |
| 7) | −16.022 | 0.1 | | 1.000 |
| 8) | 9.181 | 2.3 | 46.6 | 1.804 |
| 9) | −8.214 | 1.0 | 30.1 | 1.699 |
| 10) | 4.228 | (d10) | | 1.000 |
| 11) | 26.866 | 2.3 | 40.5 | 1.731 |
| 12) | −18.567 | 0.3 | | 1.000 |
| 13) | ∞ | 2.2 | 64.2 | 1.517 |
| 14) | ∞ | | | |

[Aspherical Surface Data]

Surface Number = 2

| $\kappa$ = | 0.7931 |
| --- | --- |
| C2 = | 0.00 |
| C4 = | −3.48E-4 |
| C6 = | −1.39E-6 |
| C8 = | −3.75E-07 |
| C10 = | 0.00 |

Surface Number = 6

| $\kappa$ = | 1.5817 |
| --- | --- |
| C2 = | 0.00 |
| C4 = | −6.44E-4 |
| C6 = | −1.83E-6 |
| C8 = | −3.37E-07 |
| C10 = | 0.00 |

Surface Number = 11

| $\kappa$ = | 28.1494 |
| --- | --- |
| C2 = | 0.00 |
| C4 = | −4.42E-4 |
| C6 = | 7.52E-6 |
| C8 = | −5.11E-07 |
| C10 = | 0.00 |

[Variable Distance Data]

| | Wide-angle end | Intermediate | Telephoto end |
| --- | --- | --- | --- |
| f | 5.79 | 9.28 | 16.28 |
| d4 | 11.81 | 5.65 | 1.24 |
| d10 | 4.74 | 8.77 | 16.87 |
| TL | 35.87 | 33.74 | 37.43 |

[Values for Conditional Expressions]

(1) $TL/(ft \times fw)^{1/2}$ = 3.7 (Wide-angle end state)
    = 3.5 (Intermediate focal length state)
    = 3.9 (Telephoto end state)
(2) (G2r1 + G2r2)/(G2r2 − G2r1) = −2.86
(3) (G3r1 + G3r2)/(G3r2 − G3r1) = −0.18

Figure 4A:
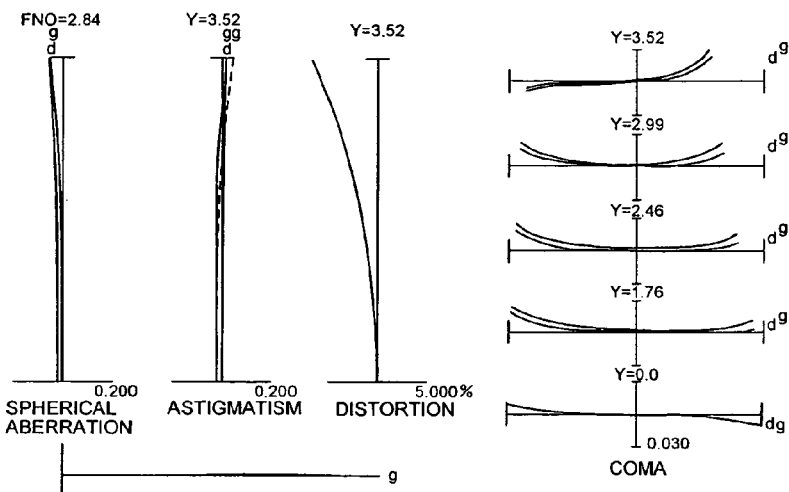
FIGS. 4A through 4C are graphs showing various aberrations of the zoom lens system according to Example 2 in a wide-angle end state, an intermediate focal length state, and a telephoto end state, respectively.
Figure 4B:
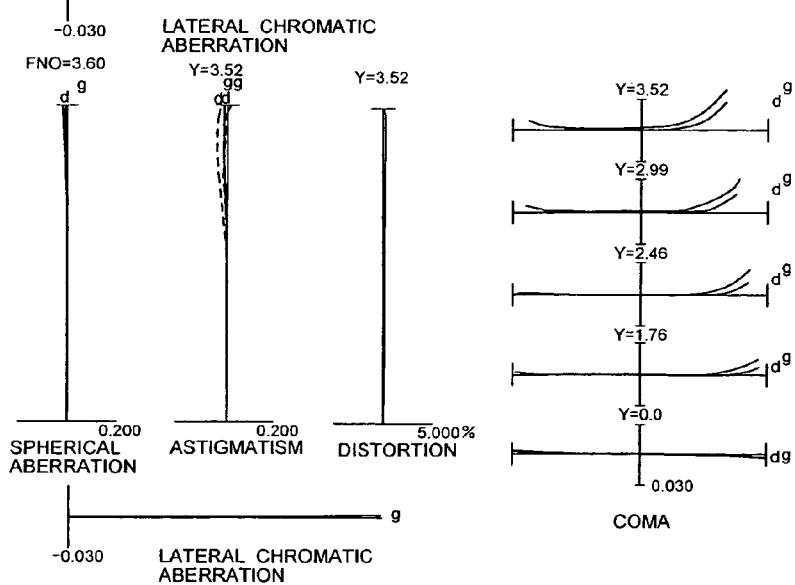
Figure 4C:
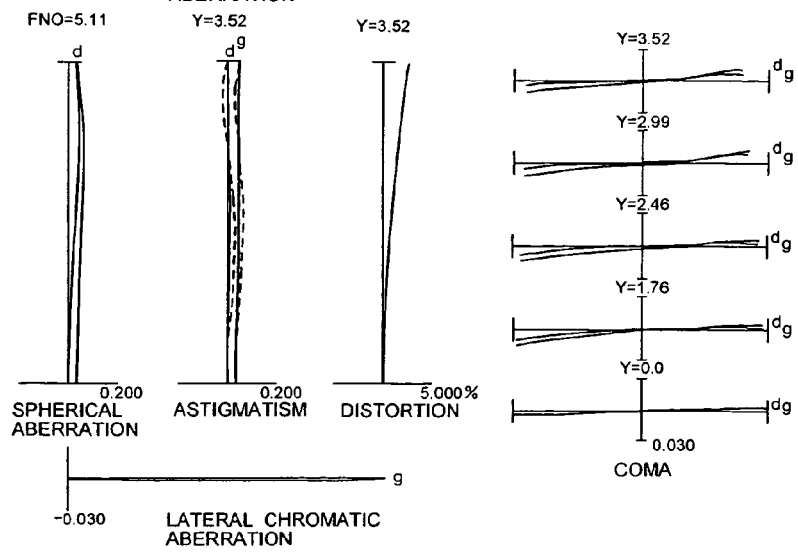

FIGS. 4A through 4C are graphs showing various aberrations of the zoom lens system according to Example 2 in a wide-angle end state, an intermediate focal length state, and a telephoto end state, respectively.

As is apparent from the respective graphs, the zoom lens system according to Example 2 shows superb optical performance as a result of good corrections to various aberrations.

EXAMPLE 3

Figure 5:
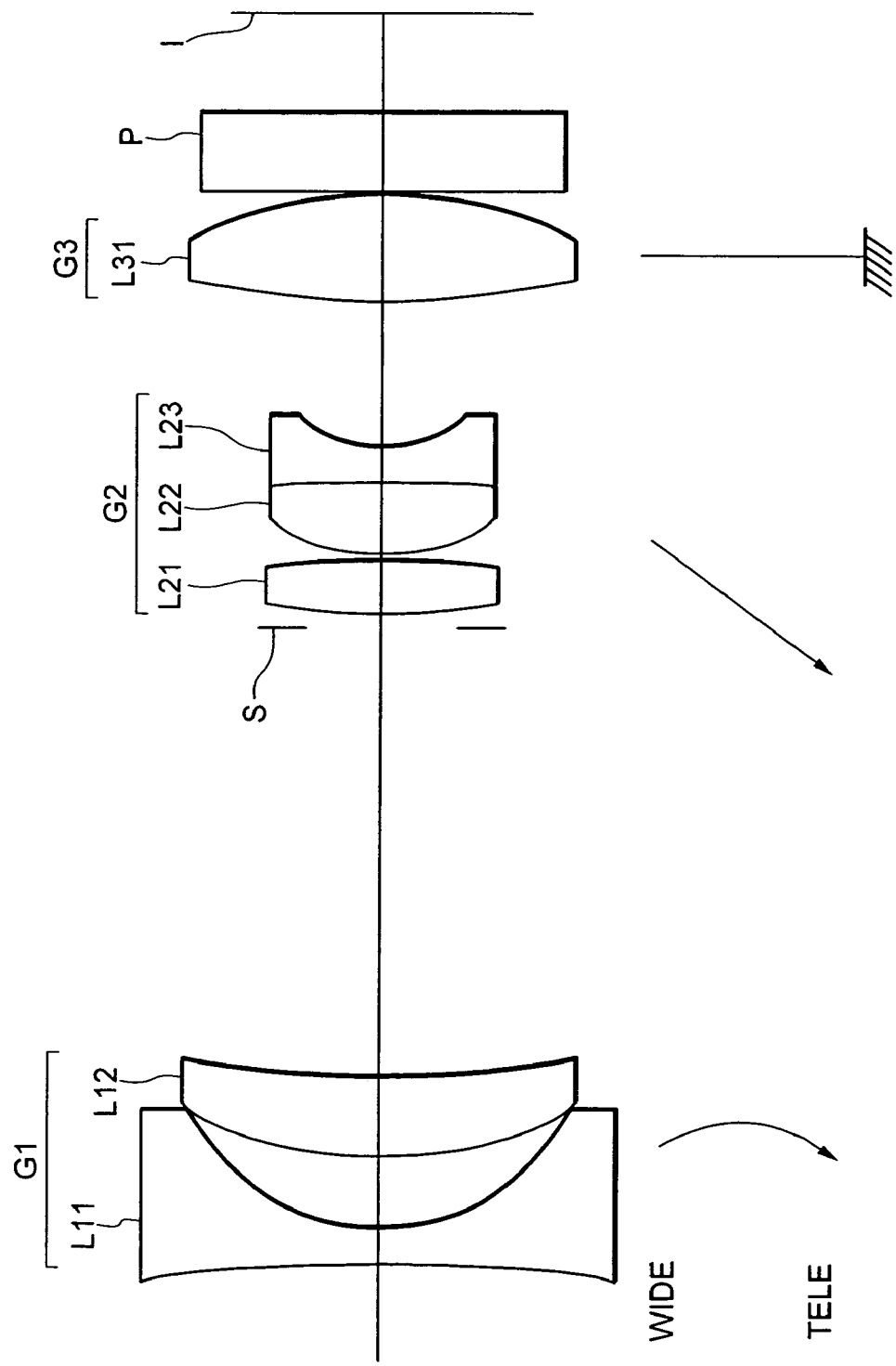
FIG. 5 is a sectional view showing a zoom lens system according to Example 3 of the present invention together with the movement of each lens group upon zooming.

FIG. 5 is a sectional view showing a zoom lens system according to Example 3 of the present invention together with the movement of each lens group upon zooming.

A zoom lens system according to Example 3 is composed of, in order from the object, a first lens group G1 having negative refractive power, a second lens group G2 having positive refractive power with an aperture stop S, and a third lens group G3 having positive refractive power.

The third lens group G3 is fixed and the first lens group G1 and the second lens group G2 are moved. In this lens construction, when the state of lens group positions is varied from the wide-angle end state (WIDE) to the telephoto end state (TELE), a distance between the first lens group G1 and the second lens group G2 decreases, and a distance between the second lens group G2 and the third lens group G3 increases.

The first lens group G1 is composed of, in order from the object, a double concave negative lens L11, and a positive meniscus lens L12 having a convex surface facing to the object.

The second lens group G2 is composed of, in order from the object, a double convex positive lens L21, and a cemented negative lens constructed by a double convex positive lens L22 cemented with a double concave negative lens L23.

The third lens group G3 is composed of a double convex positive lens L31 only. Focusing from infinity to close object is conducted by moving the third lens group G3 in the object direction.

Various values associated with Example 3 are listed in Table 3.

TABLE 3

[Specifications]

| | Wide-angle end | Telephoto end |
|---|---|---|
| f = | 5.80 | 16.24 |
| FNO = | 2.86 | 5.28 |
| 2ω = | 65.4° | 24.2° |

[Lens Data]

| | r | d | ν | n |
|---|---|---|---|---|
| 1) | −54.441 | 1.0 | 64.1 | 1.516 |
| 2) | 5.896 | 2.1 | | 1.000 |
| 3) | 15.363 | 2.2 | 29.7 | 1.820 |
| 4) | 30.783 | (d4) | | 1.000 |
| 5> | ∞ | 0.4 | | 1.000 |
| 6) | 18.866 | 1.5 | 37.0 | 1.815 |
| 7) | −25.465 | 0.1 | | 1.000 |
| 8) | 5.194 | 2.1 | 46.6 | 1.804 |
| 9) | −48.554 | 1.0 | 25.4 | 1.805 |
| 10) | 3.532 | (d10) | | 1.000 |
| 11) | 15.845 | 3.0 | 61.3 | 1.589 |
| 12) | −11.590 | 0.1 | | 1.000 |
| 13) | ∞ | 2.2 | 64.2 | 1.517 |
| 14) | ∞ | | | |

[Aspherical Surface Data]

Surface Number = 3

| | |
|---|---|
| κ = | 7.2474 |
| C2 = | 0.00 |
| C4 = | 9.61E−5 |
| C6 = | −8.56E−6 |
| C8 = | 3.84E−7 |
| C10 = | −8.01E−9 |

Surface Number = 6

| | |
|---|---|
| κ = | 4.3961 |
| C2 = | 0.00 |
| C4 = | −1.44E−4 |
| C6 = | −1.30E−5 |
| C8 = | 2.97E−6 |

TABLE 3-continued

| | |
|---|---|
| C10 = | −2.29E−7 |

Surface Number = 11

| | |
|---|---|
| κ = | −74.3625 |
| C2 = | 0.00 |
| C4 = | 9.93E−4 |
| C6 = | −5.88E−5 |
| C8 = | 1.69E−6 |
| C10 = | −2.04E−8 |

[Variable Distance Data]

| | Wide-angle end | Intermediate | Telephoto end |
|---|---|---|---|
| f | 5.80 | 10.44 | 16.24 |
| d4 | 12.69 | 5.17 | 1.82 |
| d10 | 4.15 | 9.92 | 17.13 |
| TL | 35.24 | 33.50 | 37.36 |

[Values for Conditional Expressions]

(1) $TL/(ft \times fw)^{1/2}$ = 3.6 (Wide-angle end state)
   = 3.5 (Intermediate focal length state)
   = 3.8 (Telephoto end state)
(2) (G2r1 + G2r2)/(G2r2 − G2r1) = −1.46
(3) (G3r1 + G3r2)/(G3r2 − G3r1) = −0.16

Figure 6A:
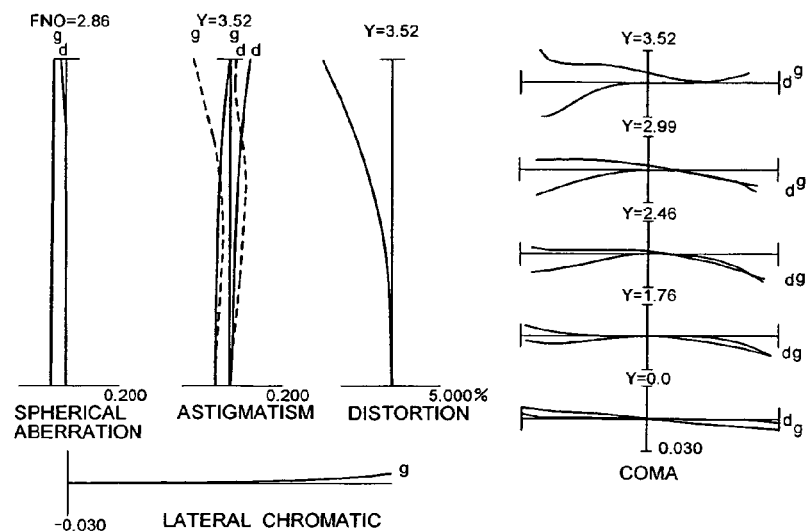
FIGS. 6A through 6C are graphs showing various aberrations of the zoom lens system according to Example 3 in a wide-angle end state, an intermediate focal length state, and a telephoto end state, respectively.
Figure 6B:
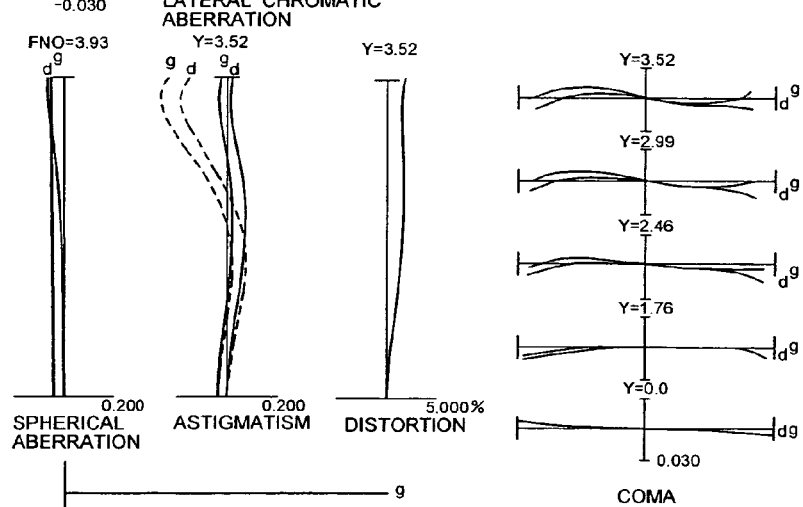
Figure 6C:
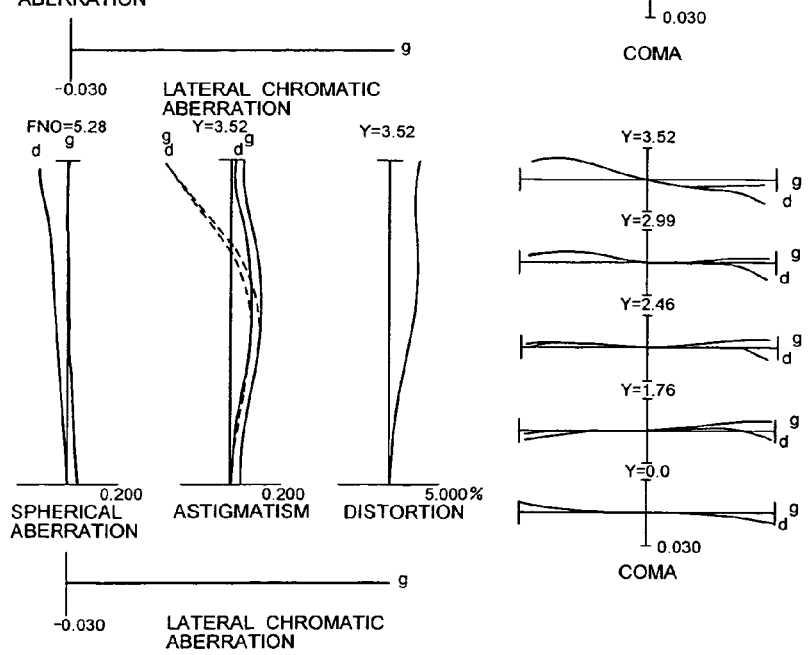

FIGS. 6A through 6C are graphs showing various aberrations of the zoom lens system according to Example 3 in a wide-angle end state, an intermediate focal length state, and a telephoto end state, respectively.

As is apparent from the respective graphs, the zoom lens system according to Example 3 shows superb optical performance as a result of good corrections to various aberrations.

EXAMPLE 4

Figure 7:
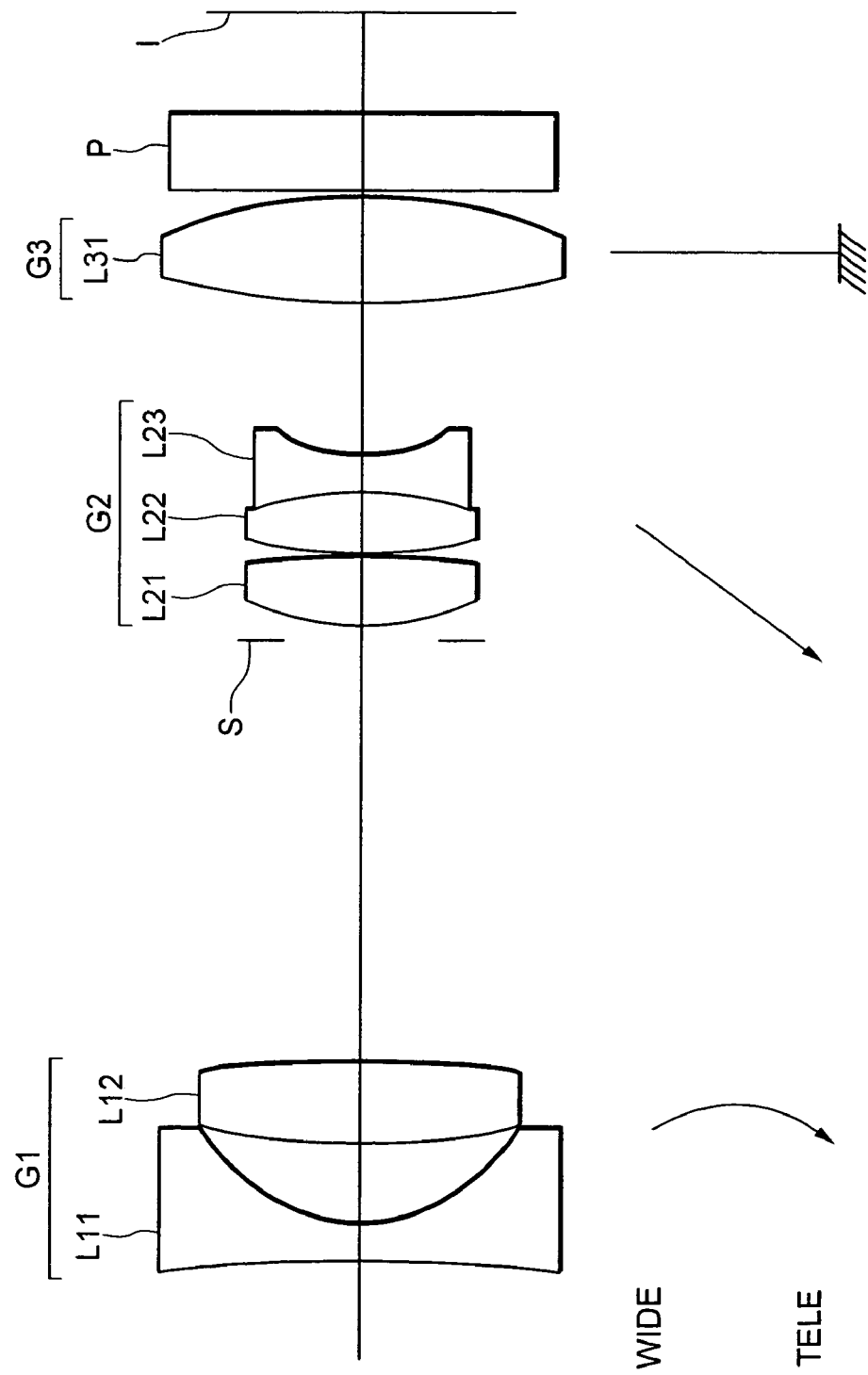
FIG. 7 is a sectional view showing a zoom lens system according to Example 4 of the present invention together with the movement of each lens group upon zooming.

FIG. 7 is a sectional view showing a zoom lens system according to Example 4 of the present invention together with the movement of each lens group upon zooming.

A zoom lens system according to Example 4 is composed of, in order from the object, a first lens group G1 having negative refractive power, a second lens group G2 having positive refractive power with an aperture stop S, and a third lens group G3 having positive refractive power.

The third lens group G3 is fixed and the first lens group G1 and the second lens group G2 are moved. In this lens construction, when the state of lens group positions is varied from the wide-angle end state (WIDE) to the telephoto end state (TELE), a distance between the first lens group G1 and the second lens group G2 decreases, and a distance between the second lens group G2 and the third lens group G3 increases.

The first lens group G1 is composed of, in order from the object, a double concave negative lens L11, and a double convex positive lens L12.

The second lens group G2 is composed of, in order from the object, a double convex positive lens L21, and a cemented negative lens constructed by a double convex positive lens L22 cemented with a double concave negative lens L23.

The third lens group G3 is composed of a double convex positive lens L31 only. Focusing from infinity to close object is conducted by moving the third lens group G3 in the object direction. Various values associated with Example 4 are listed in Table 4.

TABLE 4

[Specifications]

|  | Wide-angle end | Telephoto end |
|---|---|---|
| f = | 5.80 | 16.24 |
| FNO = | 2.94 | 5.55 |
| 2ω = | 65.4° | 24.2° |

[Lens Data]

| | r | d | ν | n |
|---|---|---|---|---|
| 1) | −64.758 | 1.0 | 64.1 | 1.516 |
| 2) | 4.974 | 2.2 | | 1.000 |
| 3) | 24.712 | 2.2 | 37.0 | 1.815 |
| 4) | −7057.251 | (d4) | | 1.000 |
| 5> | ∞ | 0.4 | | 1.000 |
| 6) | 6.960 | 1.8 | 37.0 | 1.815 |
| 7) | −29.227 | 0.1 | | 1.000 |
| 8) | 11.259 | 1.8 | 46.6 | 1.804 |
| 9) | −10.373 | 1.0 | 25.4 | 1.805 |
| 10) | 3.990 | (d10) | | 1.000 |
| 11) | 15.104 | 3.0 | 61.3 | 1.589 |
| 12) | −12.485 | 0.1 | | 1.000 |
| 13) | ∞ | 2.2 | 64.2 | 1.517 |
| 14) | ∞ | | | |

[Aspherical Surface Data]

Surface Number = 3

κ = 29.8500
C2 = 0.00
C4 = 4.01E−5
C6 = −1.31E−5
C8 = 6.69E−7
C10 = −4.97E−8

Surface Number = 4

κ = −89.0000
C2 = 0.00
C4 = −2.74E−4
C6 = 7.96E−6
C8 = −1.34E−E
C10 = 1.55E−8

Surface Number = 6

κ = 1.3229
C2 = 0.00
C4 = −6.29E−4
C6 = −5.97E−6
C8 = −7.47E−7
C10 = 6.21E−8

Surface Number = 11

κ = −54.2748
C2 = 0.00
C4 = 1.04E−3
C6 = −5.37E−5
C8 = 1.38E−6
C10 = −1.54E−8

[Variable Distance Data]

| | Wide-angle end | Intermediate | Telephoto end |
|---|---|---|---|
| f | 5.80 | 10.44 | 16.24 |
| d4 | 11.69 | 4.70 | 1.58 |
| d10 | 4.24 | 10.32 | 17.91 |
| TL | 34.44 | 33.52 | 37.99 |

[Values for Conditional Expressions]

(1) $TL/(ft \times fw)^{1/2}$ = 3.5 (Wide-angle end state)
    = 3.5 (Intermediate focal length state)
    = 3.9 (Telephoto end state)

(2) (G2r1 + G2r2)/(G2r2 − G2r1) = −3.69

TABLE 4-continued (3) (G3r1 + G3r2)/(G3r2 − G3r1) = −0.09

Figure 8A:
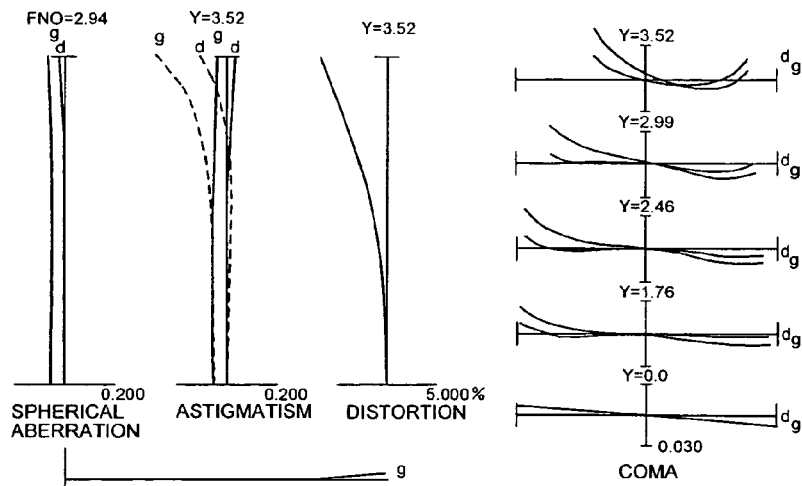
FIGS. 8A through 8C are graphs showing various aberrations of the zoom lens system according to Example 4 in a wide-angle end state, an intermediate focal length state, and a telephoto end state, respectively.
Figure 8B:
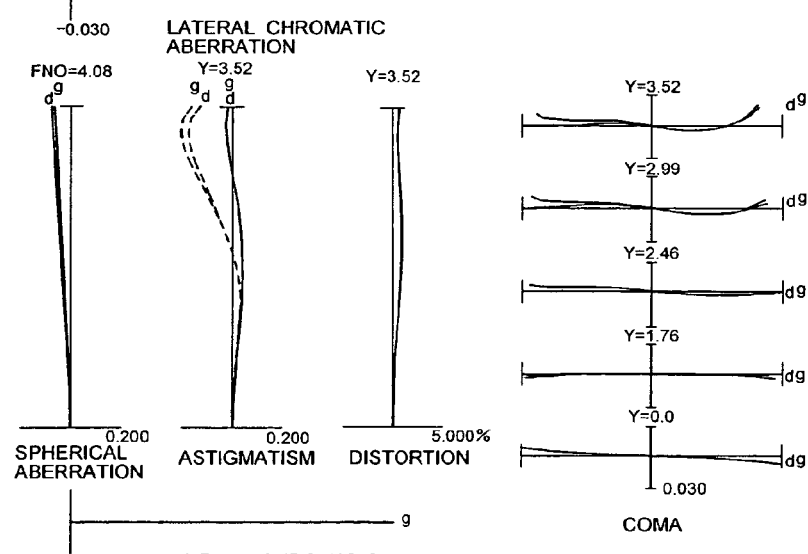
Figure 8C:
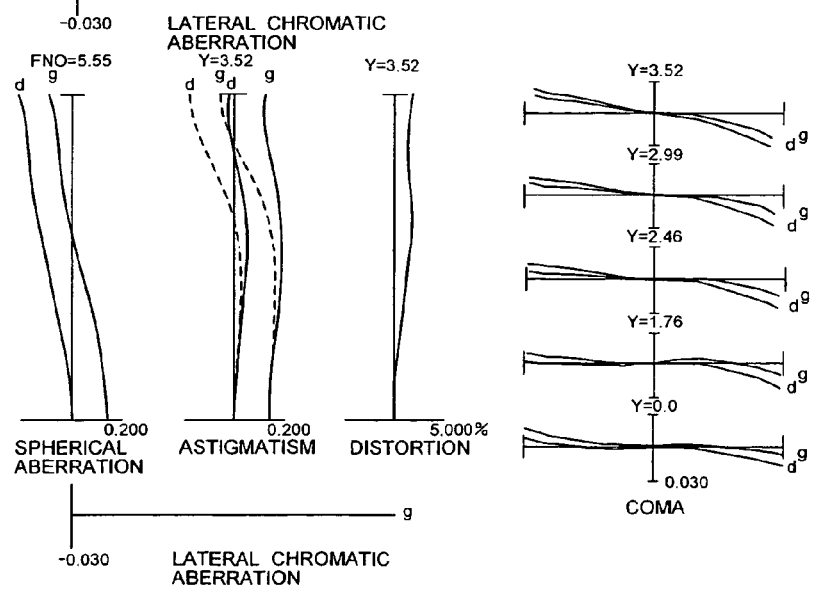

FIGS. 8A through 8C are graphs showing various aberrations of the zoom lens system according to Example 4 in a wide-angle end state, an intermediate focal length state, and a telephoto end state, respectively.

As is apparent from the respective graphs, the zoom lens system according to Example 4 shows superb optical performance as a result of good corrections to various aberrations.

EXAMPLE 5

Figure 9:
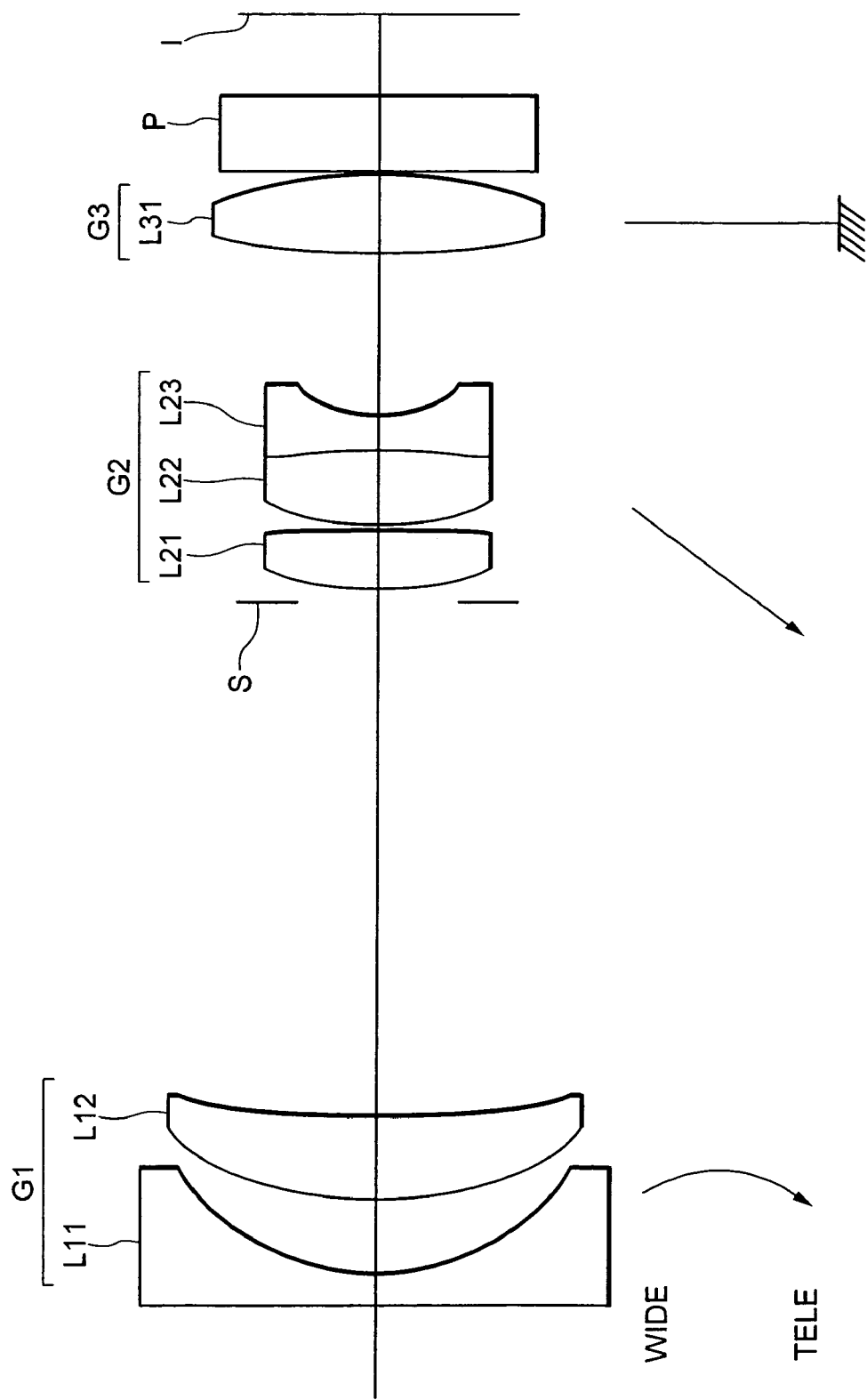
FIG. 9 is a sectional view showing a zoom lens system according to Example 5 of the present invention together with the movement of each lens group upon zooming.

FIG. 9 is a sectional view showing a zoom lens system according to Example 5 of the present invention together with the movement of each lens group upon zooming.

A zoom lens system according to Example 5 is composed of, in order from the object, a first lens group G1 having negative refractive power, a second lens group G2 having positive refractive power with an aperture stop S, and a third lens group G3 having positive refractive power.

The third lens group G3 is fixed and the first lens group G1 and the second lens group G2 are moved. In this lens construction, when the state of lens group positions varied from the wide-angle end state (WIDE) to the telephoto end state (TELE), a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing to the image, and a positive meniscus lens L12 having a convex surface facing to the object.

The second lens group G2 is composed of, in order from the object, a double convex positive lens L21, and a cemented negative lens constructed by a double convex positive lens L22 cemented with a double concave negative lens L23.

The third lens group G3 is composed of a double convex positive lens L31 only. Focusing from infinity to close object is conducted by moving the third lens group G3 in the object direction.

Various values associated with Example 5 are listed in Table 5.

TABLE 5

[Specifications]

|  | Wide-angle end | Telephoto end |
|---|---|---|
| f = | 5.89 | 16.58 |
| FNO = | 2.79 | 5.05 |
| 2ω = | 65.4° | 24.2° |

[Lens Data]

| | r | d | ν | n |
|---|---|---|---|---|
| 1) | 140.2353 | 1 | 54.66 | 1.72916 |
| 2) | 6.5997 | 2.1991 | | 1 |
| 3) | 12.8563 | 2.3535 | 34.17 | 1.68619 |
| 4) | 35.5282 | (d4) | | 1 |
| 5> | ∞ | 0.4 | | 1 |
| 6) | 8.3056 | 1.7521 | 53.22 | 1.6935 |
| 7) | −50.2506 | 0.1 | | 1 |
| 8) | 7.1824 | 2.2634 | 49.61 | 1.7725 |

TABLE 5-continued

| | | | | |
|---|---|---|---|---|
| 9) | −25.7507 | 1 | 30.13 | 1.69895 |
| 10) | 3.6245 | (d10) | | 1 |
| 11) | 19.9869 | 2.3023 | 61.24 | 1.58913 |
| 12) | 13.8343 | 0.1 | | 1 |
| 13) | ∞ | 2.17 | 64.2 | 1.5168 |
| 14) | ∞ | | | |

[Aspherical Surface Data]

Surface Number = 3

κ = 1.9078
C2 = 0.00
C4 = 1.53E−4
C6 = 9.90E−6
C8 = −4.94E−7
C10 = 1.30E−8

Surface Number = 4

κ = 77.7488
C2 = 0.00
C4 = 1.88E−4
C6 = 7.26E−6
C8 = −7.72E−7
C10 = 2.03E−8

Surface Number = 6

κ = 1.7407
C2 = 0.00
C4 = −4.69E−4
C6 = 2.16E−5
C8 = −5.57E−6
C10 = 3.83E−7

Surface Number = 11

κ = 17.5733
C2 = 0.00
C4 = −6.10E−4
C6 = 8.71E−6
C8 = −2.60E−7
C10 = −2.47E−8

[Variable Distance Data]

| | Wide-angle end | Intermediate | Telephoto end |
|---|---|---|---|
| f | 5.89 | 9.39 | 16.58 |
| d4 | 15.17 | 7.76 | 2.46 |
| d10 | 4.84 | 8.53 | 15.92 |
| TL | 38.12 | 34.29 | 36.00 |

[Values for Conditional Expressions]

(1) $TL/(ft \times fw)^{1/2}$ = 3.9 (Wide-angle end state)
    = 3.5 (Intermediate focal length state)
    = 3.6 (Telephoto end state)
(2) (G2r1 + G2r2)/(G2r2 − G2r1) = −2.55
(3) (G3r1 + G3r2)/(G3r2 − G3r1) = −0.18

Figure 10A:
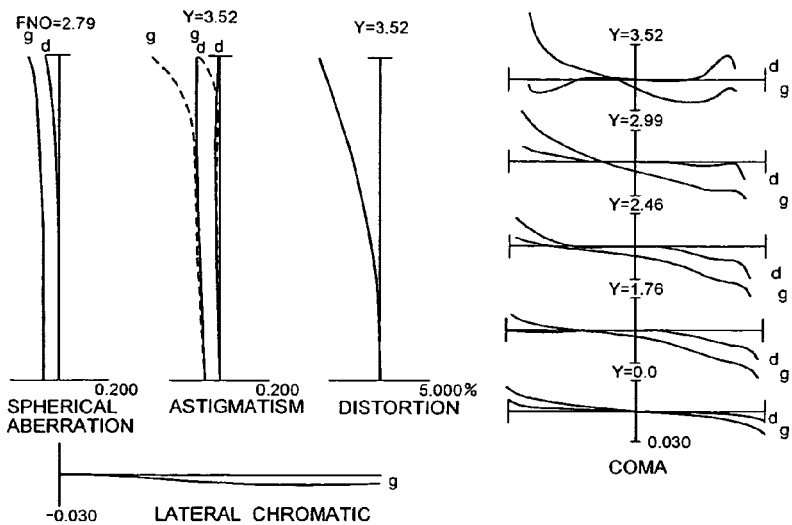
FIGS. 10A through 10C are graphs showing various aberrations of the zoom lens system according to Example 5 in a wide-angle end state, an intermediate focal length state, and a telephoto end state, respectively.
Figure 10B:
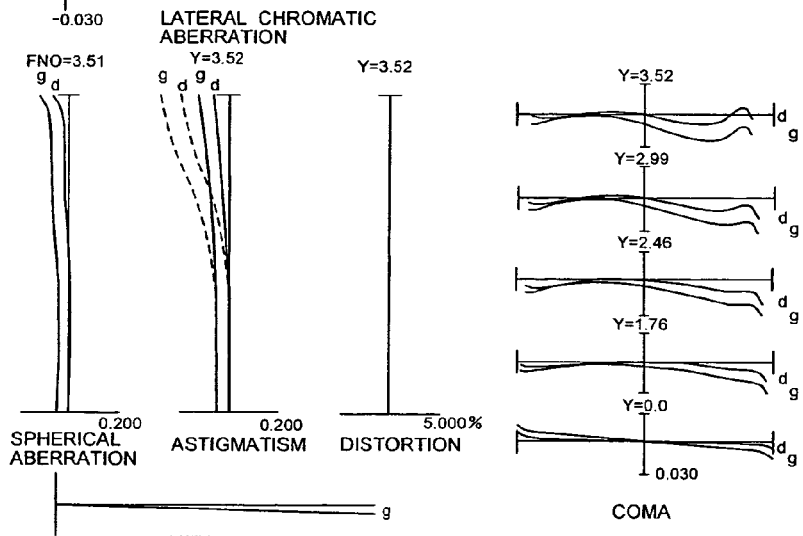
Figure 10C:
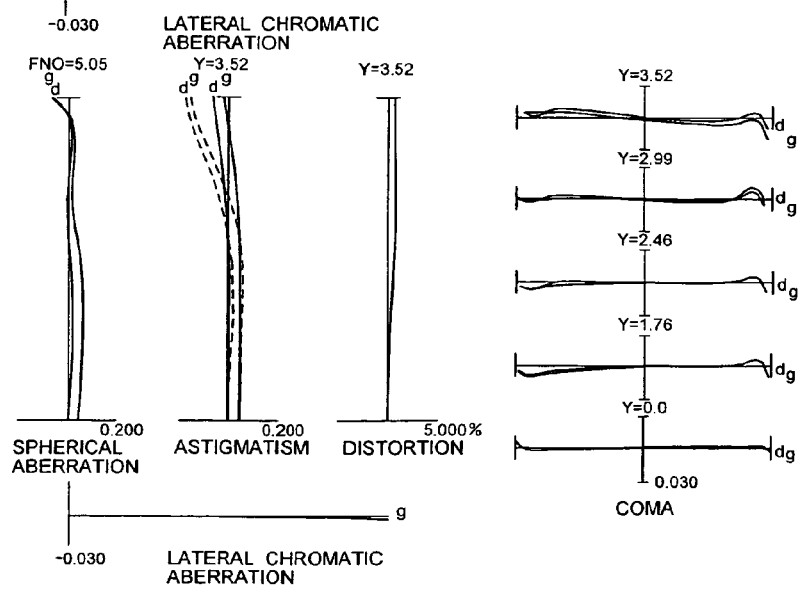

FIGS. 10A through 10C are graphs showing various aberrations of the zoom lens system according to Example 5 in a wide-angle end state, an intermediate focal length state, and a telephoto end state, respectively.

As is apparent from the respective graphs, the zoom lens system according to Example 5 shows superb optical performance as a result of good corrections to various aberrations.

A zoom lens system according to any one Example described above has advantages such as simple construction in each lens group, easy assembling and adjusting, and low manufacturing cost. Accordingly, the present invention makes it possible to provide an image gathering system equipped with the zoom lens system described above.

As described above, the present invention makes it possible to provide a zoom lens system suitable for an image gathering system using a solid-state imaging device, having a zoom ratio of about three, a small total lens length, and superb optical performance.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having negative refractive power;
   a second lens group having positive refractive power; and
   a third lens group having positive refractive power;
   the first lens group consisting of a negative lens element and a positive lens element,
   the second lens group including at least two positive lens elements and at least one negative lens element, and
   the third lens group consisting of one lens element,
   wherein the second lens group includes at least one aspherical surface, a positive lens element of said at least two positive lens elements in the second lens group is cemented with the negative lens element in the second lens group, no other cemented lens exists in the second lens group, and when a state of lens group positions varies from a wide-angle end state to a telephoto end state, a distance between the first lens group and the second lens group decreases, a distance between the second lens group and the third lens group increases, and the third lens group is fixed,
   the following conditional expression being satisfied:

$$2.5 < TL/(ft \times fw)^{1/2} < 4.5$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

2. The zoom lens system according to claim 1, wherein the first lens group includes at least one aspherical surface.

3. The zoom lens system according to claim 1, wherein the second lens group consists of, in order from the object, a positive lens element, a double convex positive lens element, and a negative lens element, the double convex positive lens element is cemented with the negative lens element, and the third lens group consists of one positive lens element.

4. The zoom lens system according to claim 1, wherein the most object side lens surface of the second lens group has a convex shape facing to the object side, the most image side lens surface of the second lens group has a concave shape facing the image side, and the following conditional expression is satisfied:

$$-4.0 < (G2r1+G2r2)/(G2r2-G2r1) < -1.0$$

where G2r1 denotes the radius of curvature of the most object side lens surface of the second lens group, and G2r2 denotes the radius of curvature of the most image side lens surface of the second lens group.

5. The zoom lens system according to claim 1, wherein the following conditional expression is satisfied:

$$-0.5 < (G3r1+G3r2)/(G3r2-G3r1) < 0.5$$

where G3r1 denotes the radius of curvature of the most object side lens surface of the third lens group, and G3r2 denotes the radius of curvature of the most image side lens surface of the third lens group.

6. The zoom lens system according to claim 1, wherein the one lens element composing the third lens group has positive refractive power and has at least one aspherical surface.

7. The zoom lens system according to claim 1, wherein focusing from infinity to close object is conducted by moving the third lens group in the object direction.

8. A zoom lens system comprising, in order from an object:
a first lens group having negative refractive power;
a second lens group having positive refractive power; and
a third lens group having positive refractive power,
the first lens group consisting of a negative lens element and a positive lens element,
the second lens group including at least two positive lens elements and at least one negative lens element, and
the third lens group consisting of one lens element,
wherein the second lens group includes at least one aspherical surface, the most object side lens surface of the second lens group has a convex shape facing the object side, the most image side lens surface of the second lens group has a concave shape facing the image side, and when a state of lens group positions varies from a wide-angle end state to a telephoto end state, a distance between the first lens group and the second lens group decreases, a distance between the second lens group and the third lens group increases, and the third lens group is fixed,
the following conditional expressions being satisfied:

$2.5 < TL/(ft \times fw)^{1/2} < 4.5$ $-4.0 < (G2r1+G2r2)/(G2r2-G2r1) < -1.0$ where TL denotes the distance between the most object side lens surface of the zoom lens system and the image plane, fw denotes the focal length of the zoom lens system in a wide-angle end state, ft denotes the focal length of the zoom lens system in a telephoto end state, G2r1 denotes the radius of curvature of the most object side lens surface of the second lens group, and G2r2 denotes the radius of curvature of the most image side lens surface of the second lens group.

9. The zoom lens system according to claim 8, wherein the first lens group includes at least one aspherical surface.

10. The zoom lens system according to claim 8, wherein the second lens group consists of, in order from the object, a positive lens element, a double convex positive lens element and a negative lens element, the double convex positive lens element is cemented with the negative lens element, and the third lens group consists of one positive lens element.

11. The zoom lens system according to claim 8, wherein the following conditional expression is satisfied:

$-0.5 < (G3r1+G3r2)/(G3r2-G3r1) < 0.5$ where G3r1 denotes the radius of curvature of the most object side lens surface of the third lens group, and G3r2 denotes the radius of curvature of the most image side lens surface of the third lens group.

12. The zoom lens system according to claim 8, wherein the one lens element composing the third lens group has positive refractive power and has at least one aspherical surface.

13. The zoom lens system according to claim 8, wherein focusing from infinity to a close object is conducted by moving the third lens group in the object direction.

14. A zoom lens system comprising, in order from an object:
a first lens group having negative refractive power;
a second lens group having positive refractive power; and
a third lens group having positive refractive power,
the first lens group consisting of a negative lens element and a positive lens element,
the second lens group including at least two positive lens elements and at least one negative lens element, and
the third lens group consisting of one lens element,
wherein the second lens group includes at least one aspherical surface, focusing from infinity to a close object is conducted by moving the third lens group in the object direction, and when a state of lens group positions varies from a wide-angle end state to a telephoto end state, a distance between the first lens group and the second lens group decreases, a distance between the second lens group and the third lens group increases, and the third lens group is fixed, the following conditional expression being satisfied:

$2.5 < TL/(ft \times fw)^{1/2} < 4.5$ where TL denotes the distance between the most object side lens surface of the zoom lens system and the image plane, fw denotes the focal length of the zoom lens system in a wide-angle end state, and ft denotes the focal length of the zoom lens system in a telephoto end state.

15. The zoom lens system according to claim 14, wherein the first lens group includes at least one aspherical surface.

16. The zoom lens system according to claim 14, wherein the second lens group consists of, in order from the object, a positive lens element, a double convex positive lens element and a negative lens element, the double convex positive lens element is cemented with the negative lens element, and the third lens group consists of one positive lens element.

17. The zoom lens system according to claim 14, wherein the following conditional expression is satisfied:

$-0.5 < (G3r1+G3r2)/(G3r2-G3r1) < 0.5$ where G3r1 denotes the radius of curvature of the most object side lens surface of the third lens group, and G3r2 denotes the radius of curvature of the most image side lens surface of the third lens group.

18. The zoom lens system according to claim 14, wherein the one lens element composing the third lens group has positive refractive power and has at least one aspherical surface.

* * * * *